MANUFACTURE OF FLEXIBLE FLAME RETARDANT FOIL CLAD LAMINATES

Filed March 9, 1966

United States Patent Office 3,473,993

Patented Oct. 21, 1969

3,473,993

MANUFACTURE OF FLEXIBLE FLAME RETARDANT FOIL CLAD LAMINATES

Charles Kepple, Penn Hills Township, Verona, Norman E. Martello, Turtle Creek, and Clarence L. Zeise, Jr., Penn Township, Irwin, Pa., assignors to Westinghouse Electric Corporation, Pittsburgh, Pa., a corporation of Pennsylvania Filed Mar. 9, 1966, Ser. No. 533,026
Int. Cl. C09j 5/04; B32b 7/00
U.S. Cl. 156—314 7 Claims

ABSTRACT OF THE DISCLOSURE

A substrate of flexible fibrous material having at least one smooth coating of a flame retardant synthetic resin permeating the material and, on at least one side thereof, a resinous adhesive on the surface of the resin coated substrate, and a metal foil to form a circuit attached to the adhesive and embedded therein.

This invention relates to flexible foil clad laminates suitable for use in printed electrical circuits or components, such as disclosed in application Ser. No. 533,002, filed Mar. 9, 1966. More particularly it pertains to the manufacture of extremely thin flexible fire retardant foil clad laminates.

Just a few years ago the electronics industry launched an intensive effort to reduce electronic circuits to smaller dimensions. In most respects the results have been spectacular. However, the trend toward micro-electronics has created a need for an improvement in reliability, performance, and cost. Indeed, the development of micro-electronic technology has been so remarkable that at the present time miniaturization is usually of secondary importance.

One contribution to the micro-electronic industry has been the so-called "printed" circuit in which some or all of the components of an electrical circuit are mounted on an insulated base by adaption of conventional printing methods. Some advantages of that type of circuit are compactness, lightweight, duplication, and economy.

Most insulating bases or carrier-webs are composed of a plurality of superimposed layers of a sheet-like material such as fiberglass or woven cotton cloth that is impregnated and coated with an electrically insulating thermosetting resin. An electrically conducting patterned foil of metal is bonded to the base by an adhesive. Most of such composites, however, have disadvantages including poor dimensional stability during processing, poor cold-flow characteristics, and separation of the base and metal pattern. Moreover, a base composed of resin impregnated fiberglass loses its flexibility with age. That is particularly true where the base is flexed repeatedly.

Associated with the foregoing is the problem of providing a flexible metal clad laminate that is flame retardant.

It has been found that the foregoing problems may be overcome by providing a laminated composite of one or more layers of circuits composed of a base of a single flexible sheet-like fibrous material having at least one coating of a flame retardant synthetic resin permeating the material and, on at least one side thereof, a resinous adhesive on the surface of the resin coated base, and a metal foil to form a circuit attached to the adhesive and embedded therein.

Accordingly, it is an object of the present invention to provide a flexible flame retardant printed circuit composition having one or more printed circuits adhesively bonded to a single sheet of a flexible fibrous base material.

It is another object of this invention to provide a flexible printed circuit composition having a single sheet of fibrous base impregnated and covered with a fully cured synthetic resin insulating material.

It is another object of this invention to provide a flexible printed surface composite which does not deform when subjected to heat, which has satisfactory cold-flow characteristics, and which has excellent dimensional stability.

It is another object of this invention to provide a method for making flexible printed circuit composites including the complete penetration of a sheet-like fibrous flexible web with a synthetic fire retardant and thereafter fully curing the resin to provide a thermostabile coating.

Other objects and advantages will appear hereinafter.

Briefly, the present invention consists essentially of a base of a flexible fibrous material having at least one smooth surfaced coating of insulating thermoset synthetic resin permeating the interstices of and impregnating the fibrous material, the synthetic resinous coatings being fully cured, the resin containing fire-retardant additives, a resinous adhesive on the surface of the fully cured resin coated base and at least one layer of a metallic foil bonded to the base of the adhesive.

The invention also includes a method for producing a flexible metal foil clad member including the steps of applying a plurality of coatings of a fire-retardant containing synthetic resin to a single sheet of flexible fibrous material, applying a resinous adhesive coating to at least one surface of the resin, heat treating the adhesive coating to a tack-free state short of complete curing, applying to a metal foil a coating of a resinous adhesive solution and driving off the solvent therefrom by heating, and hot pressing the fibrous sheet material and the foil together and heating the composite of the member and the foil to completely cure the resin and adhesive and to bond the foil to the flexible sheet.

For a better understanding of the nature and objects of this invention reference is made to the drawings in which.

Figures 1, 2, 3, 4, 5:
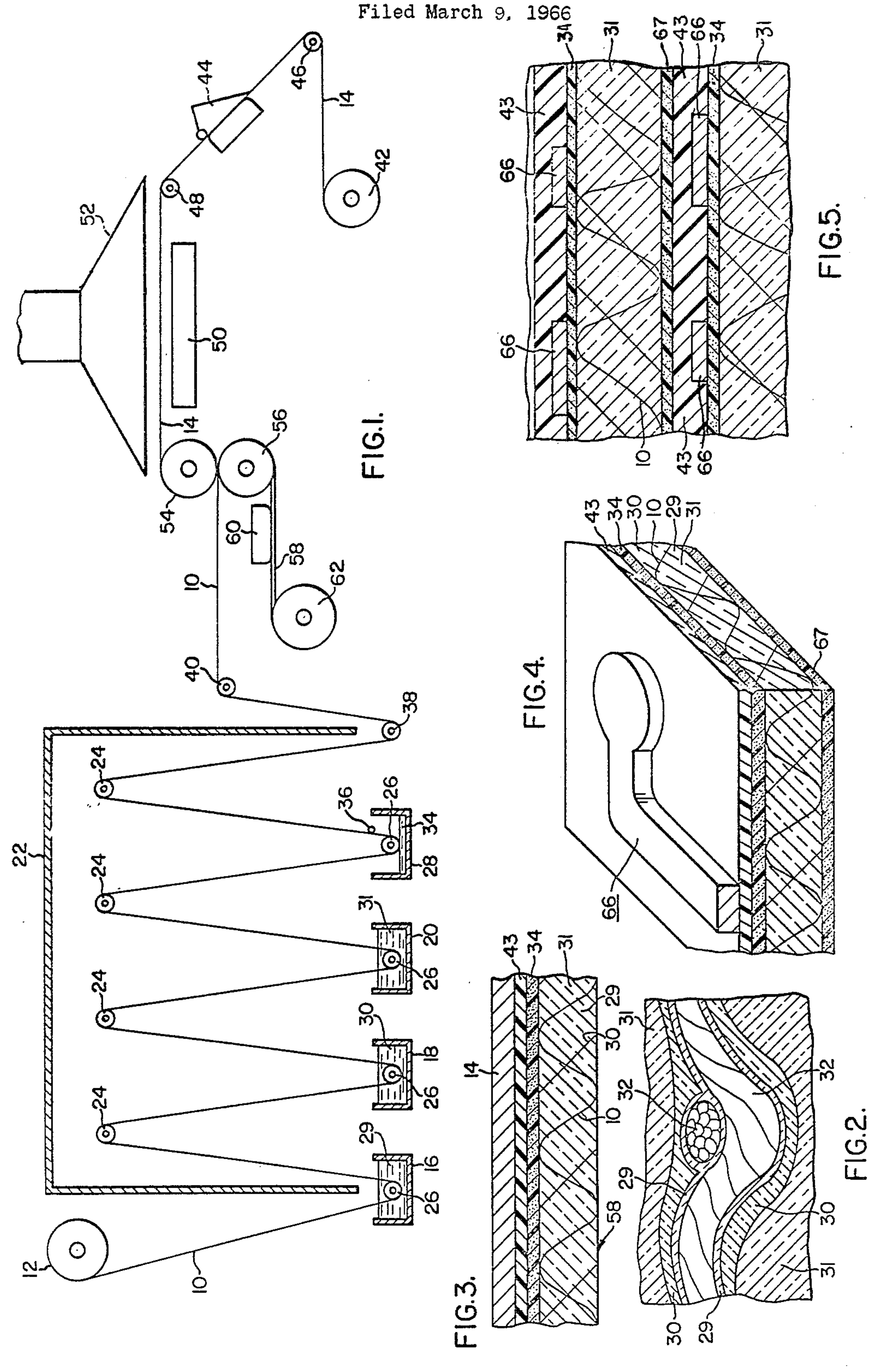
FIGURE 1 is a diagrammatic view of a process.
FIG. 2 is an enlarged sectional view showing the manner in which successive resinous coatings adhere to glass fiber strands.
FIG. 3 is an enlarged sectional view showing adjacent layers of metal foil, resinous adhesive, and a fibrous insulating base material.

FIG. 4 is an enlarged perspective view of a fragmentary portion showing a portion of a printed circuit member after the surrounding metal foil has been etched away, and showing an additional bonding resin layer on the underside of the fibrous base material; and FIG. 5 is a fragmentary vertical sectional view through a plurality of layers of printed circuits after they have been pressed together into one compact unit.

As shown in FIG. 1 a strip 10 of a fibrous carrier web or substrate of backing material is discharged from a coil 12 and is subjected to a number of coatings of insulating material before it is united with a strip 14 of metallic foil. The strip 10 is a flexible sheet-like member which is composed of a fibrous material such as woven glass fiber, dacron mats, non-woven glass mats, asbestos cloth, cotton cloth, and paper. The strip 10 is preferably provided with at least one coating of resinous material such as shown in containers or tanks 16, 18, and 20 which are disposed at the lower side of a drying tower 22 at the upper end of which are the disposed spaced rollers 24. Similar rollers 26 are provided in each tank 16, 18, and 20 for guiding the strip into the tank.

An additional tank 28 is provided for applying an adhesive coating 34 to the strip 10 after the resinous coatings 30 and 31 have been applied.

Where the strip 10 is composed of glass fiber cloth, it is preferably provided with a thin sizing coating 29 of synthetic material such as a polyvinyl alcohol or a polyvinyl butyral to improve flexiblity of the fibers.

Though the sizing 29 and coatings 30 and 31 of resin are applied to both sides of the surfaces of the strip 10 as shown in FIG. 2, the coatings of sizing and resin impregnate the fabric and cover the fibers 32. The resins are preferably synthetic and suitable examples are alkyd, phenolic and epoxy resin varnishes with added flame retardants. After each coating is applied, the strip passes through the drying tower 22 and over the rolls 24 at a speed of from 2 to 9 feet per minute. The drying tower 22 is a housing in which means for heating are provided to dry the solvent out of the resinous coatings. More than one coating of the resin is preferably applied to avoid the existence of pin holes in the outer surface of the strip on the initial coating of resin and to produce a smooth surface.

A temperature range of 135° to 165° C. and preferably about 150° C. is maintained within the tower is substantially fully cure the applied resinous coatings on the strip 10. The temperature within the drying tower 22 is closely controlled so that the successive coatings of resin, which completely saturate and impregnate the fibrous carrier web or backing, are fully cured before the coated strip 10 leaves the tower.

The carrier web or strip 10 has an original thickness of from 1 to 10 mils, depending upon the type of material used. After the resinous coatings including, for example, a thin polyvinyl alcohol precoating, have been applied and cured the thickness may vary from 3½ to 20 mils.

After the final coating of resin is applied, a coating 34 of adhesive is applied to one side of the strip 10 by passing over one roller 25 in the tank 28, whereby the strip is immersed on one side into a bath of liquid adhesive 34. To control the thickness (about ½ mil) of the coating of adhesive the strip 10 passes over a wiping bar 36 above the adhesive bath 34 comprising a synthetic adhesive resin such as epoxy, polyester, or phenolic nitrile rubber composition. The strip coated with the adhesive is partly cured by passing it through the drying tower 22 and from where it passes out of the tower over guide rollers 38 and 40.

At least one and preferably al of the coatings of sizing 29 and of resin 30 and 31 comprise a composition containing a fire retardant or flame repellent material. Such material may be composed of a major portion of a retardant such as a chlorendic alkyd varnish having the following composition in which parts are by weight:

| | Parts |
|---|---|
| Chlorendic alkyd | 272 |
| Chlorinated wax (Halowax 0077) | 20 |
| Antimony oxide | 10 |
| Whiting-$CaCO_3$ | 20 |
| Iron oxide | 3 |

The chlorendic alkyd is prepared by reacting the following:

| | Grams |
|---|---|
| Chlorendic anhydride | 282 |
| Soya fatty acid | 270 |
| Glycerol | 80 |

The soya fatty acid and glycerol are heated to about 80–90° C. The chlorendic anhydride is then added while sparging. No condenser is used. The mixture is then heated for eight hours at 175°–185° C. until an acid value of 3 is obtained. Reacting to a viscosity value of "S" on the Gardner-Holdt scale is preferred. Other alkyds may be prepared by reacting other fatty acids and one or more polyhydric alcohols with chlorendic anhydride in a similar manner.

The foregoing composition dissolved in a solvent is used to impregnate and permeate an electric grade glass fiber fabric having a thickness of about 2 mils. By using conventional dip coating techniques a flexible product having a thickness of about 4.5 mils was obtained. The glass fiber coated with fire retardant material is cured by heating in the tower at a tempearture ranging from 50–180° C. and preferably 175° C. for 25–45 minutes. The material may be folded at least 12 times (180° crease) without breaking or cracking and still retains good dielectric strength. On testing for fire retardancy, the insulation material easily passed standard tests for self-extinguishment. The dielectric strength is about 1800 volts per mil.

The coated glass fiber is then provided with an adhesive coating for subsequent bonding of metal foil thereto.

The metallic foil 14, such as copper foil, is discharged from a coil 42 and an adhesive coating 43 of about 0.5 mil thickness (FIGS. 3–5) is applied to one side of the foil by an adhesive applicator 44 which is disposed between guide rollers 46 and 48. The adhesive coating 43 preferably has a composition similar to the adhesive 34 on the strip 10. Both adhesives 34 and 43 are composed of a synthetic resin such, for example, as a phenolic-nitrile rubber copolymer.

The phenolic-nitrile rubber adhesive comprises a 20% solution methyl ethyl ketane of a mixture of equal parts by weight of acrylonitrile-rubber and B stage phenolic resin. The proportions of the nitrile rubber can be varied from 25% to 75% and the phenolic resin constitutes the balance. The phenolic resin comprises the reaction product of a phenol such as cresol and formaldehyde in substantially equimolecular proportions.

As the strip of foil 14 continues to move it passes over heating means such as infrared lamps 50 whereby the adhesive coating 43 is dried and partially cured. For that purpose an exhaust hood 52 is provided over the area of the infrared lamps 50. The strip 14 of metal foil then passes over a heated metal roll 54 which is heated to a temperature of approximately 200° C. for the purpose of further drying the adhesive 43 on the foil by evaporating more solvent. The metal roll 54 operates in conjunction with an elastomer roll 56 for pressing the adhesive coated metal strip 14 to the adhesive treated strip 10 under pressure of up to 300 p.s.i.

An excellent adhesive bond occurs when the strips 10 and 14 move between the rolls 54 and 56 with the metal foil strip 14 uppermost and the base strip 10 lowermost and adjacent to the lower roll 56. A pressure, preferably within the range of from 15 to 250 pounds per square inch, is applied to the strips 10 and 14 for joining their adhesive coatings 34 and 43 together into a single laminate 58 which is further heated by moving it in contact with a heating shoe 60 at a temperature of approximately 200° C. for finally setting the adhesive layers. Thereafter the composite laminate 58 is accumulated on a coil 62.

The composite foil clad laminate 58 is subsequently converted into a printed circuit member by removing or etching away by known techniques unnecessary portions of the metal foil leaving circuit portions 66 of the foil as shown in FIG. 4.

A plurality of composite foil clad laminates 58 in printed circuit form may be bonded together to provide multilayer circuit member as shown in FIG. 5. For that purpose a plurality of laminates 58 are stacked and pressed together after the foil has been converted into a printed circuit on each. The adhesive layer 43 at the bottom of the base strip 14 is applied in extra thickness to enable the circuit portions to be embedded when pressed together. For that purpose an adhesive layer 67 may be applied to the side of each laminate 58 opposite to that where the adhesive 43 has been applied.

The metallic foil 14 may be composed of any metal having suitable properties of electrical conductivity. Metals having good electrical conductivity include copper, silver, aluminum, and base alloys thereof. Metals having higher electrical resistance include stainless steel and Kovar or other metals or alloys. These foils are from about 0.0005 to 0.003 mils in thickness.

The adhesive nitrile rubber base resin is sold under the trademark A–821–B.

The metals having high coefficients of resistance are used for the resistance portions of a circuit.

The following examples are illustrative of the present invention.

EXAMPLE I

A 108 glass cloth of 2 mils thickness is provided with a ½ mil coating of polyvinyl alcohol. One coating of a phenolic alkyd varnish is applied to provide a relatively smooth pore-free coated surface to which a coating of a fire retardant varnish containing chlorendic alkyd resin of the composition previously set forth is applied. Then a coating of phenolic nitrile rubber adhesive is applied to the coated substrate as well as to a foil copper of 1.4 mils thickness. The adhesive is partly cured and the coated substrate and foil are bonded together by hot rolling at about 150 p.s.i. and the laminate is then substantially fully cured at about 200° C. The total thickness of the foil clad laminate is about 4.5 mils and it shows excellent flexibility properties, good thermal endurance up to 100° C., and exhibits good metal adherence. The copper foil has an average peel strength of over 8 pounds per inch of width.

EXAMPLE II

In the foregoing example a foil of 2 mils thick copper was substituted to provide a foil clad laminate having a total thickness of about 5.0 mils. The properties of flexibility and foil adherence were similarly very good.

The adherence or bond test involves pulling or peeling copper strips from the coated base by applying a load to a one inch width of foil at a 180° angle to the substrate. The load is increased until the foil begins to peel away. This load is the peel strength. In all our laminates a peel strength averaging 8 pounds or higher is obtained.

Each of the foil clad laminates of Examples I and II were converted into printed circuit members by applying a resist pattern to the foil surface, etching away the copper exposed through the pattern, and then removing the resist, thereby exposing the copper printed circuit pattern. The resulting printed circuit members can be employed in electrical apparatus, or they may be superimposed with a resinous adhesive between successive layers and the assembly consolidated under heat and pressure into a unitary member providing a multi-layer printed circuit.

Laminates having metal foil on both sides of the substrate may be produced.

After the desired circuits are obtained by a conventional method such as etching away the metal foil, a composite laminated circuit board with ten superimposed circuit sheets having a total thickness of $\frac{1}{16}$ inch may be provided by the application of a pressure from 15 to 250 p.s.i. at a molding temperature varying from 150 to 175° C. for a time from 5 minutes to 1 hour depending upon the degree of curing of the resins. Each sheet had a layer of adhesive resin applied to its surface opposite the foil clad surface to enable the sheets to bond to each other.

Accordingly, the method of the present invention provides a multi-layered printed circuit which overcomes the disadvantages of prior printed circuits such as dimensional instability and poor solderability. Moreover, the base or fiberglass may be permeated with a fire retardant enamel coating to deter and minimize occurrences of fire.

What is claimed is:

1. The process of producing a highly flexible metal-foil-clad, fire retardant, fiber-reinforced, resinous member, comprising the steps of (1) providing a sheet of flexible fibrous material of a thickness of from 0.5 to 10 mils, (2) applying at least one coating of a fire retardant resinous material to a single sheet of the fibrous material to produce a flexible sheet member of a thickness not exceeding 20 mils, (3) heating the coated fibrous sheet at a temperature ranging from 150° to 180° C. to substantially fully cure the applied resinous material and to produce a smooth pore-free sheet member, (4) applying a resinous adhesive coating to at least one surface of the flexible sheet and heat treating the adhesive coating to a tack-free state short of complete curing, (5) applying to a metal foil a coating of a resinous adhesive and heating it to a tack-free state short of complete curing, (6) bringing the heated foil in contact with the adhesive treated side of the flexible sheet member, and (7) pressing together and heating the consolidated foil and sheet to advance the cure of the adhesive and to bond with a high degree of adherence the foil to the flexible sheet member.

2. The process of claim 1 in which the sheet of fibrous material comprises glass fibers.

3. The process of claim 1 in which the resinous coated fibrous sheet is heated at a temperature of about 175° C. for about 25 minutes.

4. The process of claim 1 in which the fire retardant material includes a major amount of chlorendic alkyd resin.

5. The process of claim 1 in which the fire retardant material includes chlorendic alkyd resin and antimony oxide.

6. The process of claim 1 in which the metal foil is copper.

7. The process of claim 1 in which the metal foil is applied at a pressure of up to 300 p.s.i. and at a temperature of up to about 200° C.

References Cited

UNITED STATES PATENTS

| | | | |
|---|---|---|---|
| 3,340,606 | 9/1967 | Anderson et al. | 174—68.5 |
| 3,378,434 | 4/1968 | Harrington | 161—403 |

ROBERT F. BURNETT, Primary Examiner

W. J. VAN BALEN, Assistant Examiner

U.S. Cl. X.R.

29—625; 156—8, 278, 298, 310, 315; 161—93, 116, 165, 203, 218, 403, 413